United States Patent [19]

Suzuki et al.

[11] Patent Number: 5,773,163
[45] Date of Patent: Jun. 30, 1998

[54] SEALED ALKALINE STORAGE BATTERY

[75] Inventors: Kohei Suzuki, Yao; Noboru Ito, Toyohashi; Nobuyasu Morishita, Toyohashi; Munehisa Ikoma, Toyohashi, all of Japan

[73] Assignee: Matsushita Electric Industrial Co., Ltd., Osaka-fu, Japan

[21] Appl. No.: 864,945

[22] Filed: May 29, 1997

[30] Foreign Application Priority Data

Sep. 27, 1996 [JP] Japan .................................. 8-256631

[51] Int. Cl.[6] .............................................. H01M 10/24
[52] U.S. Cl. .......................................... 429/60; 429/206
[58] Field of Search ............................ 429/60, 206, 223, 429/57, 59

[56] References Cited

U.S. PATENT DOCUMENTS

| | | | |
|---|---|---|---|
| 3,174,878 | 3/1965 | Peters | 429/60 |
| 3,558,356 | 1/1971 | Jost | 429/60 |
| 4,003,754 | 1/1977 | Winsel et al. | 429/60 X |
| 5,131,920 | 7/1992 | Moriwaki et al. | |

FOREIGN PATENT DOCUMENTS

| | | |
|---|---|---|
| 5-211069 | 8/1993 | Japan . |
| 1100660 | 6/1984 | U.S.S.R. . |

*Primary Examiner*—Anthony Skapars
*Attorney, Agent, or Firm*—Panitch Schwarze Jacobs & Nadel, P.C.

[57] ABSTRACT

A sealed alkaline storage battery with a long cycle life is disclosed, in which an inadequate adjustment between some of the electrode plates in a cell and the difference in the deterioration resulting from the difference in the heat dissipating abilities of the plates in the cell has been obviated. The storage battery comprises an electrode group configured by piling up a plurality of positive electrodes and a plurality of negative electrodes alternately with separators interposed therebetween, wherein the capacities of the respective negative electrodes are larger than those of the adjacent positive electrodes, except for the negative electrodes positioned at both ends of the electrode group. The capacities of the positive electrodes and the negative electrodes in the central part of the electrode group are larger than those of the positive electrodes and the negative electrodes located closer to both ends of the electrode group.

11 Claims, 3 Drawing Sheets

SEALED ALKALINE STORAGE BATTERY

BACKGROUND OF THE INVENTION

The present invention relates to an improvement in a sealed alkaline storage battery, in particular a nickel-metal hydride storage battery comprising a plurality of positive electrodes and a plurality of negative electrodes piled up alternately with separators interposed therebetween.

Sealed alkaline storage batteries, represented by nickel-cadmium storage batteries and nickel-metal hydride storage batteries, have a high energy density and excellent reliability, and thus a great number of them are now used as power sources for portable electronic appliances such as lap-top computers and portable telephones.

In addition, the sealed alkaline storage batteries have recently been attracting attention in this field of the art as power sources for moving objects such as household electric appliances and electric vehicles. For such applications, a large scale battery power source system built by connecting a large number of cells in series is proposed. Each of the cells is produced by housing in a sealed battery case an electrode group configured by piling up a multiplicity of positive electrodes and negative electrodes alternately with separators interposed therebetween.

In configuring such large scale battery power source system, it is usual to use not less than 10 sheets, typically 10 plus several sheets of the positive electrodes and negative electrodes for configuring the electrode group to be contained in a cell.

In the sealed storage batteries, it is customary to make the capacity of the negative electrode larger than that of the positive electrode, thereby to cause the negative electrode to absorb oxygen gas generated from the positive electrode during overcharging. In addition, in configuring the electrode group by piling up the positive electrodes and the negative electrodes, it is usual to make the number of the negative electrodes one sheet larger than that of the positive electrodes and to place the negative electrode plates at the outermost parts of the electrode group.

Results of a cycle life test conducted on the power source of a large capacity sealed alkaline storage battery configured by connecting a great number of cells of the above-mentioned structure in series raised the following problems.

That is, even when the cells are so configured that a sum of the capacities of all the negative electrodes in one cell is larger than that of the positive electrodes, the absorption of oxygen gas during the overcharging cannot be proceeded satisfactorily if the cell contains such a negative electrode which has a smaller capacity than that of the adjacent positive electrodes. In addition, if a battery case is so designed that each of the cells can satisfactorily dissipate heat generated in the cell almost uniformly, heat dissipating abilities of the electrode plates arranged in the central part of the electrode group configured by laminating a multiplicity of electrode plates are inferior to those of the electrode plates located closer to both ends of the electrode group. For this reason, temperature of the electrode plates located in the central part of the electrode group inevitably rises, whereby particles of the hydrogen storage alloy are corroded in the negative electrodes and an irreversible product, γ-nickel oxyhydroxide, is produced at the nickel positive electrodes, resulting in a decrease in the capacities of the electrode plates.

As mentioned previously, in the cell comprising the electrode group configured by laminating a multiplicity of electrode plates, function of the cell as a whole may be impaired by inadequate adjustment between the electrode plates, or by deterioration of some of the electrode plates contained in the electrode group. Further, in a battery power source system built by connecting a multiplicity of the cells in series, the deterioration of some of the cells results in the deterioration of the module battery as a whole.

BRIEF SUMMARY OF THE INVENTION

It is therefore the primary object of the present invention to obviate the inadequate adjustment between some of the electrode plates contained in the cell and the difference in the deterioration resulting from the difference in the heat dissipating ability of the electrodes in the cell, thereby to provide a sealed alkaline storage battery which has a long cycle life.

The present invention provides a sealed alkaline storage battery comprising an electrode group which comprises a plurality of positive electrodes and a plurality of negative electrode piled up alternately with separators interposed therebetween, an alkaline electrolyte and a sealed battery case containing the above-mentioned electrode group and the alkaline electrolyte, wherein the capacities of the above-mentioned respective negative electrodes are larger than those of the adjacent positive electrodes, except for the negative electrodes positioned at both ends of the electrode group.

While the novel features of the present invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
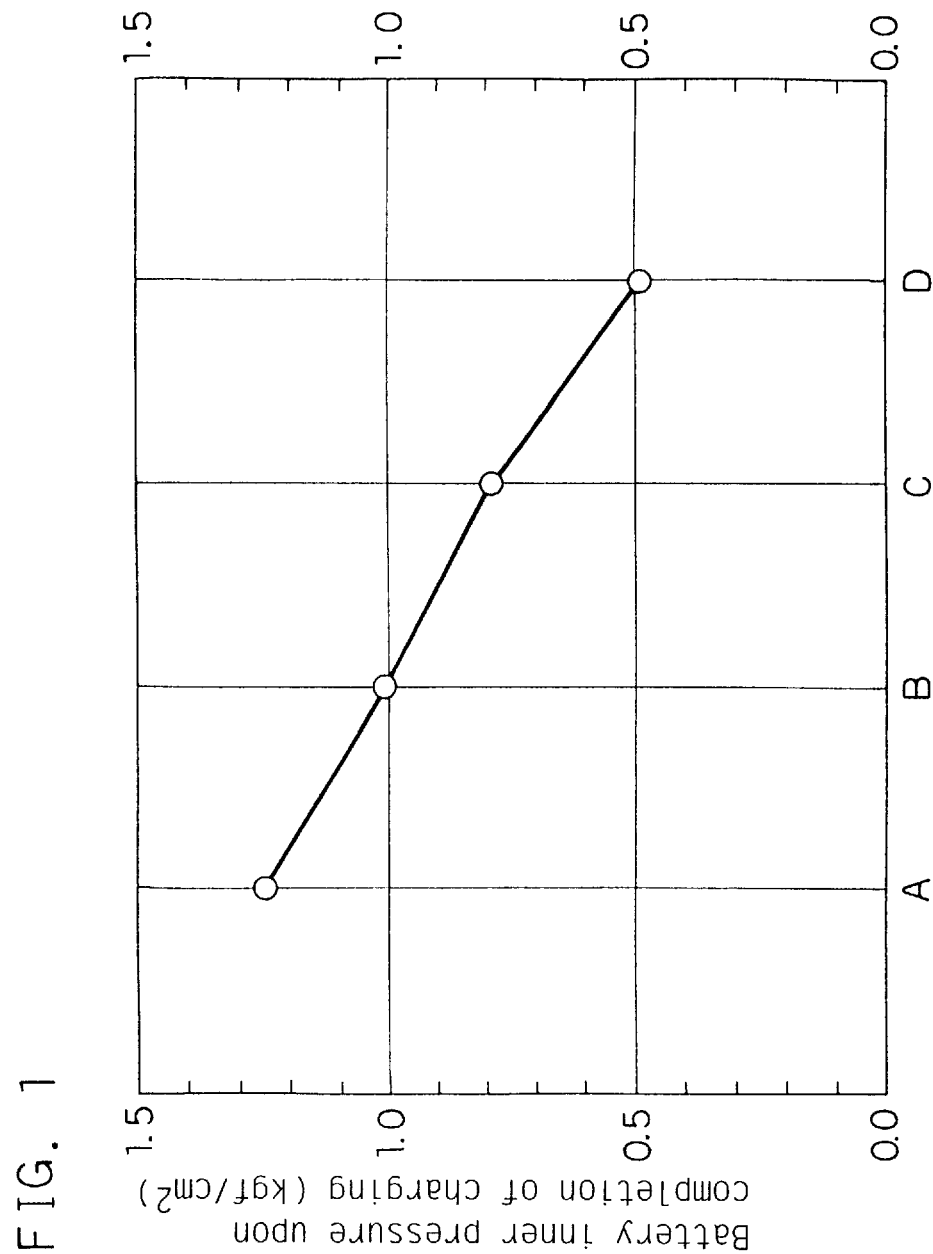
FIG. 1 is a diagram showing a comparison of the battery inner pressures upon completion of charging of the sample cells in accordance with the specific examples of the present invention.

The sealed alkaline storage battery in accordance with the present invention increases the capacities of the respective negative electrodes more than those of the adjacent positive electrodes except for the negative electrodes positioned at both ends of the electrode group, in the electrode group which comprises a multiplicity of positive electrodes and negative electrodes piled up alternately with the separators interposed therebetween.

In this kind of sealed storage battery, a system of increasing the capacities of the negative electrodes more than those of the positive electrodes is customarily employed, thereby to cause the negative electrode to absorb the oxygen gas generated from the positive electrodes during the overcharging. In the past, although the capacity of the negative electrode in the cell as a whole had been set larger than that of the positive electrode, no strict numerical control on the capacities had not been performed on the individual electrode plates.

The present inventors have now found that if the capacity of any of the negative electrode plates is smaller than those of the adjacent positive electrodes, i.e., the electrode group contains some inadequately adjusted parts, the absorption of oxygen gas generated during the overcharging is very poor, thereby to shorten the cycle life of the battery as demonstrated by the specific examples which will be described later. This is believed because a majority of the oxygen gas generated from the positive electrode during the overcharging immediately permeates through the separators and is absorbed by the confronting negative electrodes.

Therefore, in the negative electrode plates arranged at both ends of the electrode group, their outer faces are not confronted with the positive electrode and thus do not participate in the absorption of the oxygen gas. It is thus admitted that, of the negative electrode plates of a configuration comprising a conductive support and a negative electrode active material coated on both faces of the conductive support, only the negative electrode plates located at both ends of the electrode group may be coated on their one face that is confronted with the positive electrode plates, and that the capacity thereof is preferably made to be larger than ½, i.e., 50% of the capacity of the adjacent positive electrode plates.

In addition, the capacities of the positive electrodes and the negative electrodes in the central part of the electrode group in accordance with the present invention are made larger than those of the positive electrodes and the negative electrodes located closer to both ends of the electrode group. In an electrode group configured by laminating a multiplicity of electrode plates, dissipation of heat is poor and deterioration of the electrode plates is liable to proceed in the central part of the electrode group. By adopting the above-mentioned configuration, it is possible to suppress the deterioration of the electrode plates in the central part of the electrode group at early stage of the charge/discharge cycle and to make the degree of deterioration of every electrode plate in the electrode group uniform.

In order to realize a technical advantage by adopting the above-mentioned configuration, it is necessary to make the variations in the capacities of the electrode plates as a whole small. It is therefore preferable to regulate the capacities of both positive and negative electrode plates within ±5% of target values, except for the negative electrode plates placed at both ends of the electrode group.

A suitable ratio of the total capacity of the negative electrodes to the total capacity of the positive electrodes is in a range of 1.4 to 1.8, more preferably in a range of 1.5 to 1.7.

A suitable amount of the electrolyte to the capacity of the positive electrode is in a range of 1.4 to 2.0 ml/Ah, more preferably in a range of 1.6 to 1.8 ml/Ah.

According to the present invention, it is possible to obtain a sealed alkaline storage battery with a long cycle life. In addition, since the deterioration of all the electrode plates in the cell is made substantially uniform, the cell itself is made to have a long cycle life as a unit, and by connecting many cells in series, it is possible to obtain a large capacity battery power source system with a long cycle life.

In the following paragraphs, the present invention will be described in more detail by way of specific examples.

EXAMPLE 1

As a hydrogen storage alloy of the negative electrode, an alloy represented by $MmNi_{3.7}Al_{0.3}Mn_{0.4}Co_{0.6}$ (Mm represents a Misch metal) was used. Particles having an average particle diameter of 30 μm obtained by wet-pulverizing the alloy was immersed in an aqueous solution of potassium hydroxide which has a specific gravity of 1.25 at 80° C. for one hour. By mixing 100 parts by weight of the particles with 0.8 parts by weight of styrene-butadiene rubber and 0.1 part by weight of carboxymethyl cellulose, and by kneading the mixture with water, a paste of the negative electrode mixture was prepared. By coating a nickel-plated steel punched or perforated plate of a thickness of 60 μm with this paste, pressing the coated plate and cutting the pressed plate to have a predetermined size, a negative electrode plate was produced.

As the positive electrode plates, a known nickel electrode prepared by filling an active material mixture consisting mainly of nickel hydroxide powder in a foamed nickel substrate was used.

By piling up 16 sheets of the above-mentioned negative electrode plates with 15 sheets of the positive electrode plates alternately with separators of sulfonated polypropylene nonwoven fabric interposed therebetween, an electrode group was configured. By inserting this electrode group in a battery case made of a synthetic resin, injecting an electrolyte of an aqueous solution of potassium hydroxide which has a specific gravity of 1.30 in the battery case in an amount of 1.65 ml/Ah per unit capacity of the positive electrode, and gas and liquid-tightly closing the open end of the battery case with a sealing plate having a safety valve, four (cells A, B, C and D listed in Table 1 below) nickel-metal hydride storage batteries of nominal capacity of 105 Ah were configured.

Table 1 lists the capacities of the respective electrode plates positioned at one end of the electrode group to the other end in the order of the arrangement of the respective positive electrode plates and the negative electrode plates of the cells A, B, C and D.

TABLE 1

|  |  | Cell | | | |
| --- | --- | --- | --- | --- | --- |
|  |  | A | B | C | D |
| Capacity of positive electrode plate (Ah) | 1 | 5.84 | 7.14 | 6.89 | 8.01 |
|  | 2 | 9.26 | 6.56 | 7.45 | 7.45 |
|  | 3 | 6.88 | 9.64 | 6.99 | 6.58 |
|  | 4 | 7.01 | 6.88 | 8.98 | 6.69 |
|  | 5 | 5.12 | 6.54 | 6.45 | 5.89 |
|  | 6 | 6.24 | 6.23 | 5.94 | 7.89 |
|  | 7 | 9.02 | 6.18 | 9.03 | 7.45 |
|  | 8 | 8.14 | 6.47 | 6.13 | 6.56 |
|  | 9 | 6.18 | 7.84 | 6.29 | 7.12 |
|  | 10 | 7.45 | 6.01 | 6.66 | 6.69 |
|  | 11 | 7.22 | 8.88 | 6.19 | 6.97 |
|  | 12 | 5.97 | 5.97 | 6.54 | 7.21 |
|  | 13 | 5.56 | 6.68 | 7.84 | 6.14 |
|  | 14 | 9.06 | 7.41 | 6.68 | 7.64 |
|  | 15 | 6.01 | 6.56 | 6.95 | 6.48 |
|  | Total | 104.96 | 104.99 | 105.01 | 105.04 |
|  | Standard deviation | 1.34 | 1.06 | 0.95 | 0.60 |
| Capacity of negative electrode plate (Ah) | 1 | 13.01 | 10.87 | 11.23 | 10.64 |
|  | 2 | 8.38 | 11.65 | 8.56 | 8.98 |
|  | 3 | 10.12 | 8.79 | 10.24 | 9.64 |
|  | 4 | 8.23 | 9.87 | 10.23 | 9.87 |
|  | 5 | 9.56 | 10.01 | 11.08 | 11.06 |
|  | 6 | 11.68 | 12.01 | 10.89 | 10.67 |
|  | 7 | 10.24 | 11.04 | 8.79 | 9.83 |
|  | 8 | 8.65 | 9.13 | 9.68 | 9.64 |
|  | 9 | 10.65 | 9.45 | 10.46 | 10.37 |
|  | 10 | 8.68 | 9.62 | 9.67 | 9.38 |

TABLE 1-continued

|  |  | Cell | | | |
| --- | --- | --- | --- | --- | --- |
|  |  | A | B | C | D |
|  | 11 | 11.11 | 8.46 | 9.58 | 10.94 |
|  | 12 | 10.09 | 10.21 | 9.95 | 10.02 |
|  | 13 | 8.48 | 9.46 | 10.57 | 9.67 |
|  | 14 | 12.28 | 10.2 | 9.56 | 9.39 |
|  | 15 | 8.45 | 9.56 | 9.67 | 9.94 |
|  | 16 | 10.47 | 9.62 | 9.78 | 9.97 |
| Total | | 159.90 | 159.95 | 159.94 | 160.01 |
| Standard deviation | | 1.49 | 0.98 | 0.75 | 0.59 |
| Capacity ratio of negative electrode/positive electrode | | 1.523 | 1.523 | 1.523 | 1.523 |

As listed in Table 1 above, in the cell D, all the negative electrode plates have a larger capacity than the adjacent positive electrode plates. In the cells A, B and C, however, the capacities of the negative electrode plates are smaller than the capacities of the adjacent positive electrodes in the following positions:

Cell A:
positive electrode plate 2—negative electrode plate 2
positive electrode plate 7—negative electrode plate 8
positive electrode plate 14—negative electrode plate 15
Cell B:
positive electrode plate 3—negative electrode plate 3
positive electrode plate 11—negative electrode plate 11
Cell C:
positive electrode plate 7—negative electrode plate 7

Comparison of the battery inner pressures of the above-mentioned cells upon completion of charging at a current of 12 A for 10 hours after two charge/discharge cycles conducted at 25° C. are shown by the diagram in FIG. 1. As clearly shown in FIG. 1, it is appreciated that the larger the number of positions where the capacities are inadequately adjusted, the higher the battery inner pressure upon completion of charging and the inferior their gas absorbing ability during the overcharging becomes.

EXAMPLE 2

Procedures similar to those in Example 1 were followed in configuring another series of sample cells as listed in Table 2 below. In these sample cells, the capacities of the respective negative electrode plates are also larger than the capacities of the adjacent positive electrode plates, but variations in the capacities of the respective electrode plates, i.e., the difference between the maximum capacity and the minimum capacity of each of the electrode plate, are different from one another as listed in Table 2.

TABLE 2

|  |  | Cell | | | |
| --- | --- | --- | --- | --- | --- |
|  |  | D | E | F | G |
| Capacity of positive electrode plate (Ah) | 1 | 8.01 | 7.21 | 7.01 | 7.13 |
|  | 2 | 7.45 | 7.06 | 6.94 | 7.16 |
|  | 3 | 6.58 | 6.78 | 7.36 | 6.84 |
|  | 4 | 6.69 | 7.15 | 6.94 | 6.94 |
|  | 5 | 5.89 | 6.69 | 6.66 | 6.98 |
|  | 6 | 7.89 | 6.84 | 7.15 | 7.10 |
|  | 7 | 7.45 | 6.87 | 7.20 | 6.87 |
|  | 8 | 6.56 | 7.31 | 6.81 | 6.92 |

TABLE 2-continued

|  |  | Cell | | | |
| --- | --- | --- | --- | --- | --- |
|  |  | D | E | F | G |
|  | 9 | 7.12 | 6.99 | 6.94 | 6.92 |
|  | 10 | 6.69 | 6.97 | 6.84 | 7.06 |
|  | 11 | 6.97 | 6.87 | 7.16 | 7.03 |
|  | 12 | 7.21 | 7.18 | 7.10 | 7.01 |
|  | 13 | 6.41 | 7.21 | 6.87 | 6.89 |
|  | 14 | 7.64 | 7.05 | 7.15 | 7.15 |
|  | 15 | 6.48 | 6.87 | 6.88 | 7.02 |
| Total | | 105.04 | 105.05 | 105.01 | 105.02 |
| Variation | | 2.12 | 0.62 | 0.70 | 0.32 |
| Capacity of negative electrode plate (Ah) | 1 | 10.64 | 11.67 | 10.40 | 10.31 |
|  | 2 | 8.98 | 9.45 | 9.87 | 9.94 |
|  | 3 | 9.64 | 9.42 | 9.52 | 10.15 |
|  | 4 | 9.87 | 10.13 | 9.68 | 9.79 |
|  | 5 | 11.06 | 9.56 | 10.46 | 9.85 |
|  | 6 | 10.67 | 11.71 | 10.19 | 9.83 |
|  | 7 | 9.83 | 10.05 | 9.87 | 10.21 |
|  | 8 | 9.64 | 9.64 | 9.59 | 10.25 |
|  | 9 | 10.37 | 9.84 | 10.34 | 9.75 |
|  | 10 | 9.38 | 9.74 | 10.06 | 10.16 |
|  | 11 | 10.94 | 9.87 | 9.97 | 10.13 |
|  | 12 | 10.02 | 9.71 | 10.39 | 9.94 |
|  | 13 | 9.67 | 10.14 | 9.72 | 9.96 |
|  | 14 | 9.39 | 10.01 | 9.76 | 9.89 |
|  | 15 | 9.94 | 9.24 | 10.09 | 9.87 |
|  | 16 | 9.97 | 9.84 | 10.10 | 10.01 |
| Total | | 160.01 | 160.02 | 160.01 | 160.04 |
| Variation | | 2.08 | 2.47 | 0.94 | 0.56 |
| Capacity ratio of negative electrode/positive electrode | | 1.523 | 1.523 | 1.524 | 1.524 |

Figure 2:
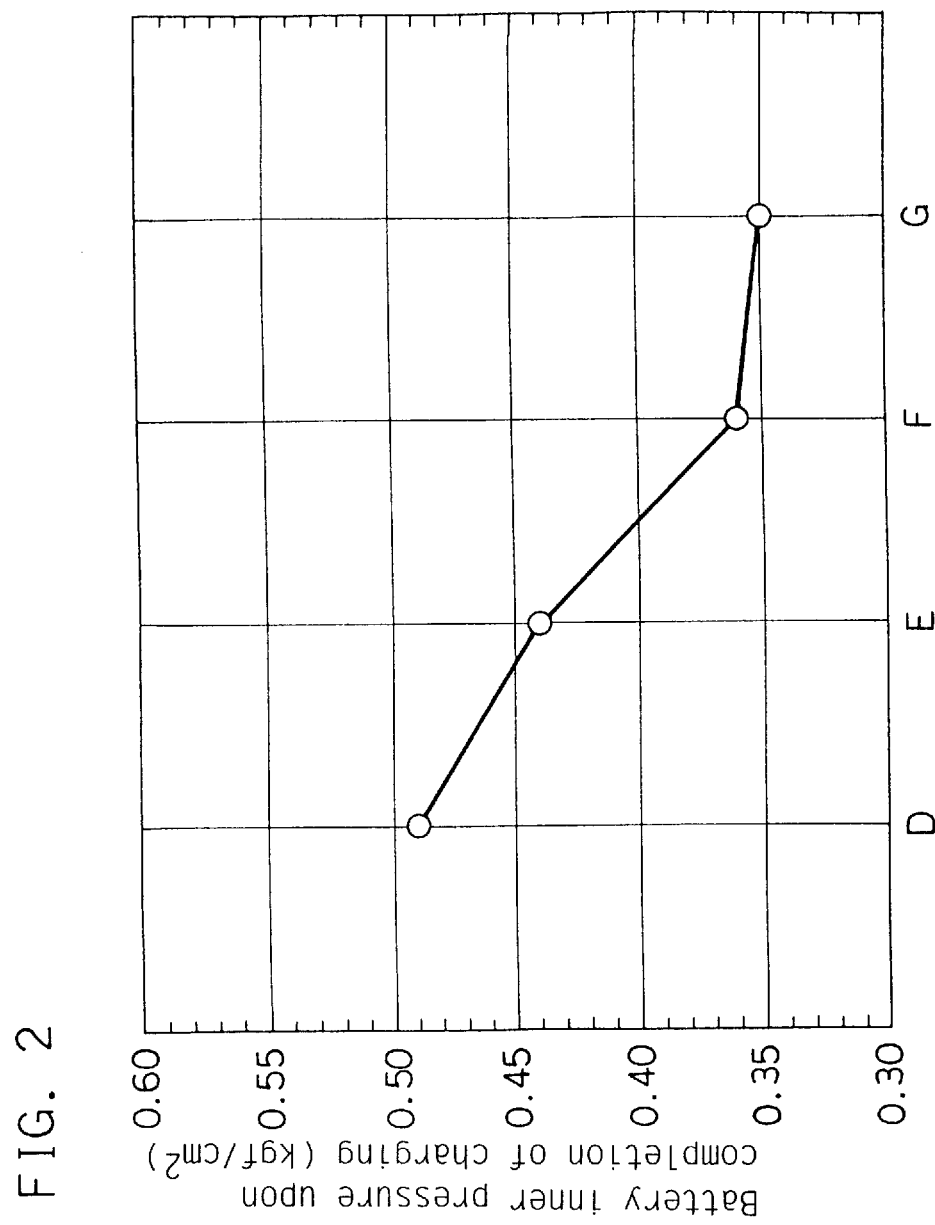
FIG. 2 is a diagram showing a comparison of the battery inner pressures upon completion of charging of the sample cells in accordance with the other specific examples of the present invention.

Comparison of the battery inner pressures of the above-mentioned cells upon completion of charging at a current of 12 A for 10 hours after two charge/discharge cycles conducted at 25° C. are shown by the diagram in FIG. 2. As clearly shown in FIG. 2, it is appreciated that the smaller the variations in their capacities of the positive and negative electrode plates of one cell, the better their gas absorbing ability during the overcharging becomes.

EXAMPLE 3

In this specific example, an investigation was conducted on the battery performance under the conditions in which all the negative electrode plates have a larger capacity than those of the adjacent positive electrode plates, and both the positive electrode plates and negative electrode plates have a very small variations in their capacities are fulfilled. For clarifying the differences in the performances resulting from the differences in the capacities of the electrode plates in the central part of the electrode group from those of the electrode plates located closer to both ends of the electrode group, as compared with the case wherein the capacities of the electrode plates are substantially the same throughout the electrode group, the sample cells were prepared. Their capacities are listed in Table 3.

TABLE 3

|  |  | Cell | | | |
| --- | --- | --- | --- | --- | --- |
|  |  | H | I | J | K |
| Capacity of positive electrode plate (Ah) | 1 | 7.34 | 7.06 | 6.98 | 6.66 |
|  | 2 | 7.28 | 7.03 | 6.94 | 6.78 |
|  | 3 | 7.15 | 6.94 | 7.01 | 6.87 |

TABLE 3-continued

| | | Cell | | | |
|---|---|---|---|---|---|
| | | H | I | J | K |
| | 4 | 7.03 | 7.01 | 6.99 | 6.99 |
| | 5 | 6.91 | 6.99 | 7.06 | 7.08 |
| | 6 | 6.84 | 6.96 | 7.07 | 7.16 |
| | 7 | 6.75 | 7.02 | 6.99 | 7.25 |
| | 8 | 6.66 | 7.02 | 6.93 | 7.32 |
| | 9 | 6.72 | 6.95 | 7.01 | 7.29 |
| | 10 | 6.83 | 6.94 | 7.00 | 7.18 |
| | 11 | 6.94 | 7.06 | 7.02 | 7.06 |
| | 12 | 7.02 | 6.98 | 7.02 | 6.99 |
| | 13 | 7.11 | 6.97 | 6.98 | 6.89 |
| | 14 | 7.20 | 7.05 | 6.94 | 6.78 |
| | 15 | 7.29 | 6.99 | 7.05 | 6.65 |
| | Total | 105.07 | 104.97 | 104.99 | 104.95 |
| Capacity of | 1 | 10.41 | 10.03 | 9.58 | 9.52 |
| negative electrode | 2 | 10.29 | 10.09 | 9.69 | 9.68 |
| plate (Ah) | 3 | 10.13 | 9.98 | 9.84 | 9.83 |
| | 4 | 10.01 | 9.96 | 9.96 | 9.91 |
| | 5 | 9.93 | 9.90 | 10.06 | 10.08 |
| | 6 | 9.85 | 10.05 | 10.13 | 10.21 |
| | 7 | 9.74 | 9.93 | 10.31 | 10.34 |
| | 8 | 9.55 | 9.91 | 10.42 | 10.45 |
| | 9 | 9.64 | 10.08 | 10.46 | 10.49 |
| | 10 | 9.71 | 10.01 | 10.29 | 10.26 |
| | 11 | 9.85 | 10.00 | 10.15 | 10.15 |
| | 12 | 9.94 | 9.94 | 10.06 | 10.06 |
| | 13 | 10.05 | 10.02 | 9.96 | 9.93 |
| | 14 | 10.18 | 10.01 | 9.81 | 9.78 |
| | 15 | 10.31 | 10.07 | 9.68 | 9.65 |
| | 16 | 10.43 | 10.06 | 9.59 | 9.59 |
| | Total | 160.02 | 160.04 | 159.99 | 159.93 |
| Capacity ratio of negative electrode/positive electrode | | 1.523 | 1.525 | 1.524 | 1.524 |

As listed in Table 3, the cell H has a configuration wherein the capacities of the electrode plates in the central part of the electrode group are smaller than those of the electrode plates located closer to both ends of the electrode group. The cell I is so configured that the variations in the capacities of the electrode plates are made small (smaller than 0.2 Ah) in both the plates placed in the central part and located closer to both ends of the electrode group. The cell J is configured such that the electrode plates placed in the central part of the electrode group have larger capacities than those located closer to both ends of the electrode group. The cell K is configured such that the capacities of electrode plates become smaller towards both ends of the electrode group.

Figure 3:
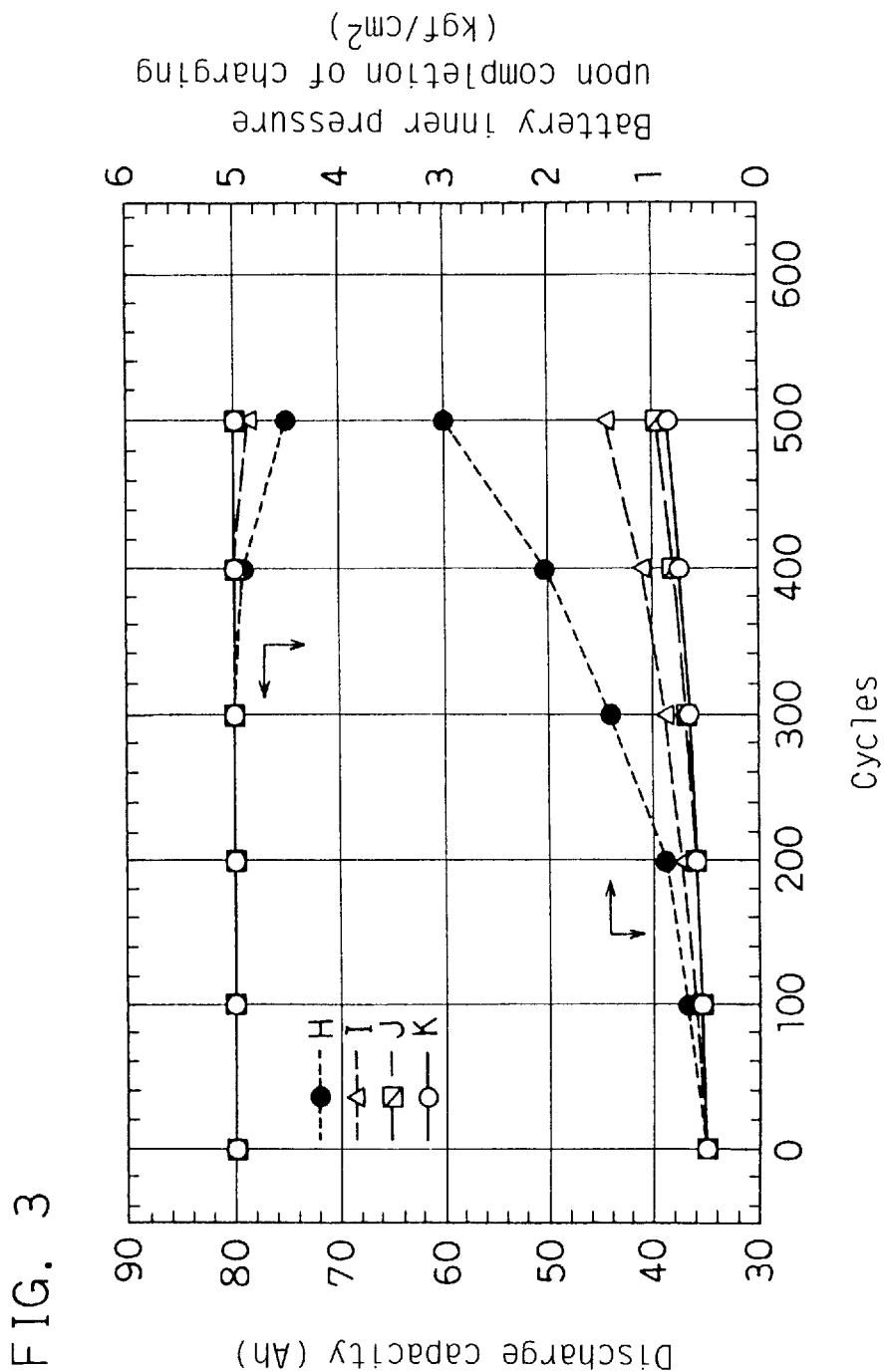
FIG. 3 is a diagram showing a relationship between the charge/discharge cycle and the discharge capacity and a relationship between the charge/discharge cycle and the battery inner pressure upon completion of charging of the sample cells in accordance with the other specific examples.

The above-mentioned cells were subjected to a charge/discharge test conducted by charging them at a current of 50 A at an ambient temperature of 30° C. for 2 hours and discharging at a current of 80 A until their terminal voltage dropped to 1.0 V. FIG. 3 shows variations in the discharge capacities (left ordinate) and the battery inner pressures (right ordinate) upon completion of charging depicted by taking cycles on the abscissa. As clearly seen from this diagram, it is appreciated that the cells J and K show very small deteriorations in their discharge capacities after 500 charge/discharge cycles and small rises in the battery inner pressures, and thus they are expected to have further a long cycle life.

EXAMPLE 4

In this specific example, too, an investigation was conducted on the battery performance under the conditions in which all the negative electrode plates have a larger capacity than those of the adjacent positive electrode plates, both the positive electrode plates and negative electrode plates have very small variations in their capacities, and the electrode plates placed in the central part of the electrode group have larger capacities than those of the electrode plates located closer to both ends of the electrode group are fulfilled. For clarifying the differences in the performances obtained by varying the ratio of the total capacity of all the negative electrode plates to that of the positive electrode plates, sample cells were prepared. Their capacities are listed in Table 4 and Table 5. The capacity of the respective electrode plates used in the sample cells and the ratio of the capacity of all the negative electrode plates to the positive electrode plates are also listed in Table 4 and Table 5.

TABLE 4

| | | Cell | | | | | |
|---|---|---|---|---|---|---|---|
| | | L | M | K | N | O | P |
| Capacity of positive electrode plate (Ah) | 1 | 6.65 | 6.66 | 6.66 | 6.67 | 6.65 | 6.67 |
| | 2 | 6.78 | 6.77 | 6.78 | 6.79 | 6.78 | 6.77 |
| | 3 | 6.88 | 6.89 | 6.87 | 6.85 | 6.88 | 6.87 |
| | 4 | 7.00 | 6.98 | 6.99 | 6.96 | 6.98 | 6.97 |
| | 5 | 7.06 | 7.07 | 7.08 | 7.09 | 7.09 | 7.07 |
| | 6 | 7.17 | 7.18 | 7.16 | 7.18 | 7.18 | 7.19 |
| | 7 | 7.27 | 7.25 | 7.25 | 7.27 | 7.28 | 7.26 |
| | 8 | 7.33 | 7.34 | 7.32 | 7.33 | 7.34 | 7.35 |
| | 9 | 7.26 | 7.27 | 7.29 | 7.26 | 7.24 | 7.25 |
| | 10 | 7.17 | 7.19 | 7.18 | 7.17 | 7.14 | 7.15 |
| | 11 | 7.07 | 7.06 | 7.06 | 7.07 | 7.08 | 7.05 |
| | 12 | 6.99 | 6.98 | 6.99 | 6.99 | 7.01 | 6.97 |
| | 13 | 6.90 | 6.88 | 6.89 | 6.91 | 6.92 | 6.92 |
| | 14 | 6.76 | 6.78 | 6.78 | 6.74 | 6.73 | 6.81 |
| | 15 | 6.66 | 6.66 | 6.65 | 6.67 | 6.67 | 6.65 |
| | Total | 104.95 | 104.96 | 104.95 | 104.95 | 104.95 | 104.95 |

TABLE 5

| | | Cell | | | | | |
|---|---|---|---|---|---|---|---|
| | | L | M | K | N | O | P |
| Capacity of negative electrode plate (Ah) | 1 | 8.10 | 8.83 | 9.52 | 10.66 | 11.22 | 11.86 |
| | 2 | 8.16 | 8.89 | 9.68 | 10.78 | 11.34 | 11.99 |
| | 3 | 8.23 | 9.04 | 9.83 | 10.91 | 11.47 | 12.14 |
| | 4 | 8.34 | 9.25 | 9.91 | 11.08 | 11.61 | 12.26 |
| | 5 | 8.44 | 9.36 | 10.08 | 11.24 | 11.74 | 12.41 |
| | 6 | 8.53 | 9.48 | 10.21 | 11.33 | 11.96 | 12.54 |
| | 7 | 8.74 | 9.55 | 10.34 | 11.46 | 12.11 | 12.71 |
| | 8 | 8.83 | 9.62 | 10.45 | 11.62 | 12.30 | 12.89 |
| | 9 | 8.86 | 9.57 | 10.49 | 11.63 | 12.29 | 12.91 |
| | 10 | 8.81 | 9.51 | 10.26 | 11.52 | 12.14 | 12.81 |
| | 11 | 8.60 | 9.44 | 10.15 | 11.41 | 11.98 | 12.63 |
| | 12 | 8.48 | 9.34 | 10.06 | 11.28 | 11.79 | 12.50 |
| | 13 | 8.37 | 9.22 | 9.93 | 11.11 | 11.64 | 12.36 |
| | 14 | 8.24 | 9.10 | 9.78 | 10.98 | 11.51 | 12.21 |
| | 15 | 8.18 | 8.92 | 9.65 | 10.84 | 11.38 | 12.05 |
| | 16 | 8.11 | 8.82 | 9.59 | 10.70 | 11.26 | 11.91 |
| | Total | 135.02 | 147.94 | 159.93 | 178.55 | 187.74 | 198.18 |
| Capacity ratio of negative/positive electrodes | | 1.287 | 1.409 | 1.524 | 1.701 | 1.789 | 1.888 |

The above-mentioned cells were subjected to a charge/discharge test by charging them at a current of 50 A at an ambient temperature of 30° C. for 2 hours and discharging at a current of 80 A until their terminal voltages dropped to 1.0 V. Table 6 below shows variations in the discharge capacities and the battery inner pressures upon completion of charging of the respective cells.

TABLE 6

| | Cell | | | | | |
|---|---|---|---|---|---|---|
| | L | M | K | N | O | P |
| Discharge capacity (Ah) | | | | | | |
| 0 cycle | 80 | 80 | 80 | 80 | 80 | 80 |
| 100 | 80 | 80 | 80 | 80 | 80 | 80 |
| 200 | 80 | 80 | 80 | 80 | 80 | 80 |
| 300 | 78 | 80 | 80 | 80 | 80 | 80 |
| 400 | 71 | 80 | 80 | 80 | 80 | 78 |
| 500 | 64 | 80 | 80 | 80 | 80 | 72 |
| Battery inner pressure (kgf/cm$^2$) | | | | | | |
| 0 cycle | 0.42 | 0.46 | 0.50 | 0.58 | 0.88 | 1.34 |
| 100 | 0.49 | 0.50 | 0.50 | 0.61 | 0.89 | 2.41 |
| 200 | 1.01 | 0.56 | 0.55 | 0.63 | 0.91 | 3.56 |
| 300 | 4.18* | 0.64 | 0.63 | 0.66 | 0.93 | 4.15* |
| 400 | 4.21* | 0.71 | 0.71 | 0.70 | 0.94 | 4.15* |
| 500 | 4.20* | 0.88 | 0.79 | 0.76 | 0.96 | 4.15* |

Note:
*indicates actuation of the safety valve.

As clearly appreciated from Table 6, if the capacity ratio of negative electrode/positive electrode is small, the volume of the electrode group is inevitably small and space in the cell becomes large, and thus the battery inner pressure is low at the initial stage of the charge/discharge cycle. The battery inner pressure however rises with the progress of the charge/discharge cycle because of poor gas absorbing ability of the negative electrode, resulting in actuation of the safety valve. The decrease in the discharge capacity is remarkable, resulting in a short cycle life. By contrast, if the capacity ratio of negative electrode/positive electrode is too large, the volume of the electrode group is inevitably large and the space in the cell becomes small, and thus the battery inner pressure is high even in the initial stage of the charge/discharge cycle. In addition, the decrease in the discharge capacity caused by the rise in the battery inner pressure with the progress of the charge/discharge cycle leads to a short cycle life of the cell. Based on the above results, it is concluded that the suitable capacity ratio of negative electrode/positive electrode is in a range of 1.4 to 1.8.

EXAMPLE 5

In this specific example, procedures similar to those for the cell K of the previous example are followed for configuring another series of sample cells, except that amounts of the electrolyte are varied as listed in Table 7 below. The sample cells are subjected to the charge/discharge test under the same conditions as in Example 4. The variations in the discharge capacities of the cells and the battery inner pressures are also listed in Table 7.

TABLE 7

| | Cell | | | | | | |
|---|---|---|---|---|---|---|---|
| | Q | R | S | K | T | P | V |
| Amount of electrolyte (ml/Ah) | 1.2 | 1.4 | 1.6 | 1.65 | 1.8 | 2.0 | 2.2 |
| Discharge capacity (Ah) | | | | | | | |
| 0 cycle | 78 | 79 | 80 | 80 | 80 | 80 | 80 |
| 100 | 77 | 79 | 80 | 80 | 80 | 80 | 80 |
| 200 | 76 | 79 | 80 | 80 | 80 | 80 | 80 |
| 300 | 73 | 78 | 80 | 80 | 80 | 80 | 78 |
| 400 | 70 | 78 | 80 | 80 | 80 | 80 | 71 |
| 500 | 66 | 78 | 80 | 80 | 80 | 79 | 61 |
| Battery inner pressure (kgf/cm$^2$) | | | | | | | |
| 0 cycle | 0.38 | 0.41 | 0.45 | 0.50 | 0.61 | 0.80 | 1.15 |
| 100 | 0.39 | 0.43 | 0.47 | 0.50 | 0.64 | 0.91 | 1.68 |
| 200 | 0.46 | 0.45 | 0.52 | 0.55 | 0.69 | 1.03 | 2.95 |
| 300 | 0.54 | 0.51 | 0.59 | 0.63 | 0.76 | 1.15 | 4.11* |
| 400 | 0.63 | 0.58 | 0.67 | 0.71 | 0.84 | 1.28 | 4.13* |
| 500 | 0.74 | 0.65 | 0.75 | 0.79 | 0.92 | 1.41 | 4.13* |

Note:
*indicates actuation of the safety valve.

As clearly appreciated from Table 7, if the amount of the electrolyte is small, the battery inner pressure is low at the initial stage of the charge/discharge cycle but the discharge capacity is small because the utilization of the positive electrode is low. In addition, since oxygen gas which is generated from the positive electrode at early stage of charging corrodes the negative electrode, the cycle life of the battery is short. By contrast, if the amount of the electrolyte is large, the utilization of the positive electrode rises but the gas absorbing ability of the negative electrode is lowered, thereby to make the safety valve ready to actuate, shortening the cycle life. Based on the above results, it is concluded that the suitable amount of the electrolyte is in a range of 1.4 to 2.0 ml/Ah (per unit capacity of the positive electrode).

EXAMPLE 6

Thermocouples were inserted in the battery case of a cell configured in the same structure as that of the cell K of the previous example and placed close to each of the positive electrode plates of odd numbers, i.e., of every other sheet. Immediately after performing three charge/discharge cycles by charging at a current of 50 A at 25° C. for 2 hours and discharging at a current of 80 A for 1 hour on the obtained cell, the temperatures near the positive electrodes were measured. In addition, after performing 500 charge/discharge cycles by charging at a current of 50 A at 30° C. for 2 hours and discharging until the terminal voltage dropped to 1.0 V, the positive electrode plates of odd numbers were taken out, and the amounts of the produced γ-nickel oxyhydroxide were roughly determined by X-ray diffraction. The results of the measurements were listed in Table 8 below. The amounts of the determined γ-nickel oxyhydroxide are represented by taking the value of the electrode plate No.1 as 1.00. As clearly shown in Table 8, the electrode groups closer to the central part show higher temperatures in order from outward to inward.

TABLE 8

| Electrode plate | Temperature after three cycles (°C.) | Amount of γ-oxy nickel hydroxide (relative value) |
| --- | --- | --- |
| 1 | 26.8 | 1.00 |
| 3 | 27.9 | 1.34 |
| 5 | 29.3 | 1.78 |
| 7 | 32.3 | 2.58 |
| 9 | 33.6 | 2.61 |
| 11 | 30.1 | 2.01 |
| 13 | 28.4 | 1.46 |
| 15 | 26.7 | 1.11 |

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

We claim:

1. A sealed alkaline storage battery comprising an electrode group which comprises a plurality of positive electrodes and a plurality of negative electrodes piled up alternately with separators interposed therebetween, an alkaline electrolyte and a sealed battery case containing said electrode group and said alkaline electrolyte, wherein the capacities of said respective negative electrodes are larger than those of the adjacent positive electrodes, except for the negative electrodes positioned at both ends of said electrode group.

2. The sealed alkaline storage battery in accordance with claim 1, wherein the capacities of the positive electrodes and the negative electrodes in the central part of said electrode group are larger than those of the positive electrodes and the negative electrodes located closer to both ends of said electrode group.

3. The sealed alkaline storage battery in accordance with claim 1, wherein each of the negative electrodes comprises a conductive support and an active material coated on both faces of the conductive support except for the negative electrodes positioned at both ends of said electrode group, said negative electrodes positioned at both ends of said electrode group comprising a conductive support and an active material coated on one face of the conductive support confronting with the adjacent positive electrode.

4. The sealed alkaline storage battery in accordance with claim 3, wherein the capacity of each negative electrode positioned at both ends of said electrode group is larger than 50% of the capacity of the positive electrode confronting with said negative electrode.

5. The sealed alkaline storage battery in accordance with claim 1, wherein the ratio of the total capacity of the negative electrodes to the total capacity of the positive electrodes is in a range of 1.4 to 1.8.

6. The sealed alkaline storage battery in accordance with claim 1, wherein the amount of the electrolyte to the capacity of the positive electrodes is in a range of 1.4 to 2.0 ml/Ah.

7. A sealed alkaline storage battery comprising an electrode group which comprises a plurality of positive electrodes and a plurality of negative electrodes piled up alternately with separators interposed therebetween, an alkaline electrolyte and a sealed battery case containing said electrode group and said alkaline electrolyte, wherein the capacities of said respective negative electrodes are larger than those of the adjacent positive electrodes, except for the negative electrodes positioned at both ends of said electrode group, and wherein the capacities of the positive electrodes and the negative electrodes in the central part of said electrode group are larger than those of the positive electrodes and the negative electrodes located closer to both ends of said electrode group.

8. The sealed alkaline storage battery in accordance with claim 7, wherein each of the negative electrodes comprises a conductive support and an active material coated on both faces of the conductive support except for the negative electrodes positioned at both ends of said electrode group, said negative electrodes positioned at both ends of said electrode group comprising a conductive support and an active material coated on one face of the conductive support confronting with the adjacent positive electrode.

9. The sealed alkaline storage battery in accordance with claim 8, wherein the capacity of each negative electrode positioned at both ends of said electrode group is larger than 50% of the capacity of the positive electrode confronting with said negative electrode.

10. The sealed alkaline storage battery in accordance with claim 7, wherein the ratio of the total capacity of the negative electrodes to the total capacity of the positive electrodes is in a range of 1.4 to 1.8.

11. The sealed alkaline storage battery in accordance with claim 7, wherein the amount of the electrolyte to the capacity of the positive electrodes is in a range of 1.4 to 2.0 ml/Ah.

* * * * *